United States Patent [19]

Suemori

[11] 4,415,907
[45] Nov. 15, 1983

[54] PRINTING PULSE CONTROL CIRCUIT FOR THERMAL PRINTING HEAD

[75] Inventor: Noboru Suemori, Yokohama, Japan

[73] Assignee: Hitachi, Ltd., Tokyo, Japan

[21] Appl. No.: 318,394

[22] Filed: Nov. 5, 1981

[30] Foreign Application Priority Data

Nov. 7, 1980 [JP] Japan .................................. 55-155952
Jun. 19, 1981 [JP] Japan .................................. 56-93847

[51] Int. Cl.³ .............................................. G01D 15/10
[52] U.S. Cl. .................................. 346/76 PH; 400/120
[58] Field of Search .................... 346/76 PH; 219/216; 400/120

[56] References Cited

U.S. PATENT DOCUMENTS 4,284,876 8/1981 Ishibashi et al. ................ 346/76 PH Primary Examiner—Elliot A. Goldberg
Assistant Examiner—Todd E. De Boer
Attorney, Agent, or Firm—Antonelli, Terry & Wands

[57] ABSTRACT

In a thermal printing head for use in a facsimile printer or the like, unevenness of printing consistency occurs which is due to temperature variation of the thermal resistor elements and due to the difference in printing data resulting from black record information or white record information of the printing data for the preceding line. A printing pulse control circuit for the thermal printing head stores the information for the preceding line, and applies a printing pulse of smaller pulse width to the thermal resistor elements heated by the black record information for the preceding line and a printing pulse of larger pulse width to the thermal resistor elements not heated with white record information for the preceding line to make uniform black printing consistency for the present line irrespective of the type of printing data for the preceding line.

4 Claims, 4 Drawing Figures

PRINTING PULSE CONTROL CIRCUIT FOR THERMAL PRINTING HEAD

BACKGROUND OF THE INVENTION

This invention relates to a control circuit for a thermal printing head arranged in a facsimile system or the like and more particularly to a printing pulse control circuit which controls the delivery of printing pulses so that heat generation in heat generator elements constituting a thermal printing head is so controlled as to effect uniform printing on thermal printing paper.

A variety of types of printing are available in facsimile but some of them do not satisfy compatibility with scanning systems, economical advantages and maintenance requirements. Accordingly, of many printing types, electrostatic printing, thermal printing, ink jet printing, current conduction type thermal printing, discharge puncture printing or electrolysis printing is typically used for facsimile. Today, used for high speed printers (adapted for GIII standard) calling for high speed operation and high resolution is electrostatic printing because of its high printing speed and ability to produce clear printing pictures although an operational arrangement for practicing the electrostatic printing is rather complicated and has somewhat difficulties with maintenance; and used for medium speed printers (adapted for GII standard) is thermal printing which satisfies economical advantages and easy maintenance and dispenses with development and fixing devices. Currently, improvements in printing paper and printing head make way for employment for high speed printers of the thermal printing whose economical advantages and easy maintenance are highly evaluated.

A printing head adapted for thermal printing has a number of thermal resistor elements arranged in line, as disclosed in U.S. Pat. No. 3,984,844, for example. The head is connected with a drive circuit adapted to sequentially pass signal currents in response to printing signals through the thermal resistor elements, so that printing is effected on thermal printing paper which is in contact with the head. The multiple thermal resistor elements adapted for the thermal printing head is fabricated in the form of either a thick film or a thin film, and the drive circuit may be rendered compatible with either type of head.

As described above, in a facsimile system adopting thermal printing, a number of thermal resistor elements are aligned to constitute a thermal printing head, and desired thermal resistor elements are heated and brought into contact with thermal printing paper to color the paper, thereby effecting printing. In a thermal printing based on the above type of printing, the thermal printing head, on the one hand, is required to be of high thermal response, and high heat-proof and wear-proof properties and the thermal printing paper, on the other hand, is required to be of excellent coloring characteristics and high printing consistency. In the past, in order to improve the above various characteristics, attempts have been made to improve the response of the thermal resistor elements constituting the thermal printing head and the resistor elements thin.

However, conventional technologies, though having experienced the aforementioned improvements, disdadvantageously faced uneven printing consistency due to temperature variation in the thermal printing head, due to the difference in printing data resulting from black record information or white record information for the preceding line, and due to the time difference between completion of printing operation for the preceding line and initiation of printing operation for the present line.

FIG. 1 illustrates a conventional control circuit adapted to generate pulses for controlling heat generation in thermal resistor elements of a thermal printing head 7. The control circuit comprises NAND circuits 1 and 2 connected to input terminals S and C, AND circuits 3 and 5 respectively connected to an input terminal $D_1$ and an output terminal $D_o$, open-collector type inverter drive circuits $6a$ to $6n$, and latch circuits $4a$ to $4n$ connected to the output of the NAND circuit 2 and the output of the AND circuit 3. The terminals S, C, $D_1$ and $D_o$ serve as a strobe signal input terminal, a clock signal input terminal, a data input terminal and a latch output terminal, respectively. Denoted by $Q_1$ to $Q_n$ are output signal terminals which have connections to heat generation control terminals of the thermal resistor elements of the thermal printing head.

With the control circuit, input information applied to the data input terminal $D_1$ is serially stored in the latch circuits $4a$ to $4n$ in synchronism with a clock signal applied to the terminal C, and when a strobe signal (a pulse wave) is applied to the terminal S, the output or outputs of one or ones of the inverter drive circuits $6a$ to $6n$ corresponding to the serial information of "1" are rendered "0". Thus, the thermal resistor elements of the thermal printing head connected with the output terminals $Q_1$ to $Q_n$, one or ones corresponding to the "0" output bit or bits of the inverter drive circuits are applied with currents and portions of printing paper in contact with the thermal resistor elements in current conduction color to effect printing of given information.

However, since with the conventional control circuit shown in FIG. 1, the pulse width of current applied to the thermal resistor element is controlled only by the strobe signal from the terminal S, unevenness of printing consistency due to temperature difference in the thermal printing head occurs upon on-off switching of the strobe signal and in addition, when "black" printing information follows "white" printing information, printing consistency of the "black" printing information is disadvantageously made pale.

SUMMARY OF THE INVENTION

It is an object of the present invention to provide a printing pulse control circuit for a thermal printing head which can prevent the above prior art drawbacks, namely, occurrence of unevenness of printing consistency due to temperature variation in the thermal printing head and due to the difference in printing data resulting from black record information or white record information for the preceding line and which can control the printing pulses so that consistency of black record for the present line is made uniform irrespective of the temperature difference in the printing head and the printing data for the preceding line.

According to the first aspect of the invention, there is provided a printing pulse control circuit for a thermal printing head comprising latch circuits of n bits, and latch circuits with set terminals each adapted to store each bit information of each of the latch circuits in the form of parallel information, whereby when both the serial information stored in the latch circuit and parallel information stored in the latch circuits with set terminals are of logical output "1", a first strobe signal having a larger pulse width is produced as the output pulse and when the serial information is of logical output "1" and the parallel information is of logical output "0", a second strobe signal having a smaller pulse width than that of the first strobe signal is selected in respect of each bit, the selected signal and a third strobe signal applied as a pre-heat pulse are ORed, and then the logical sum signal is delivered through the inverter drive circuit as the output pulse for controlling heat generation in the thermal resistor element of the thermal printing head, thereby preventing occurrence of unevenness of printing irrespective of temperature conditions in the printing head and the difference in data resulting from "white" or "black" information for the preceding line. Semiconductor elements included in the printing pulse control circuit are formed on a single silicon chip.

According to a second aspect of the invention, there is provided a thermal printing apparatus comprising a first printing pulse generator circuit for generating a first pulse, a second pulse generator circuit for generating a second pulse having a pulse width larger than that of the first pulse, a serial/parallel converter circuit of n bits, and a circuit for comparison of printing data for the present line which is now to be printed and printing data for the preceding line which has already been printed, whereby when the printing data for the present line is of black record information and that for the preceding line is of black record information, the first printing pulse of smaller pulse width from the first printing pulse generator circuit is applied to the thermal resistor element; when the printing data for the present line is of black record information and that for the preceding line is of white record information, the second printing pulse of larger pulse width from the second printing pulse generator circuit is applied to the thermal resistor element; and when the printing pulse for the present line is of white record information, no printing pulse is applied to the thermal resistor element, thereby making uniform black printing consistency for the present line irrespective of the printing data for the preceding line.

DESCRIPTION OF PREFERRED EMBODIMENTS

Figure 1:
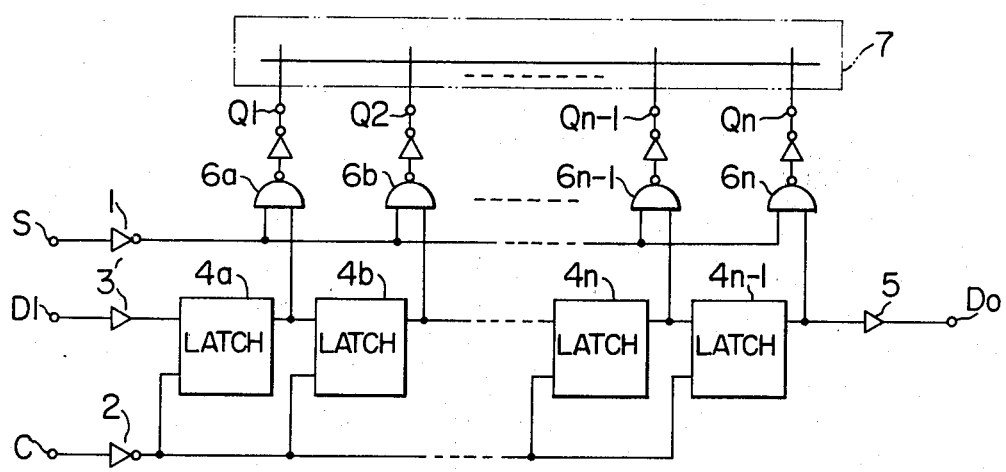
FIG. 1 is a circuit diagram of a prior art printing pulse control circuit for a thermal printing head.
Figure 2:
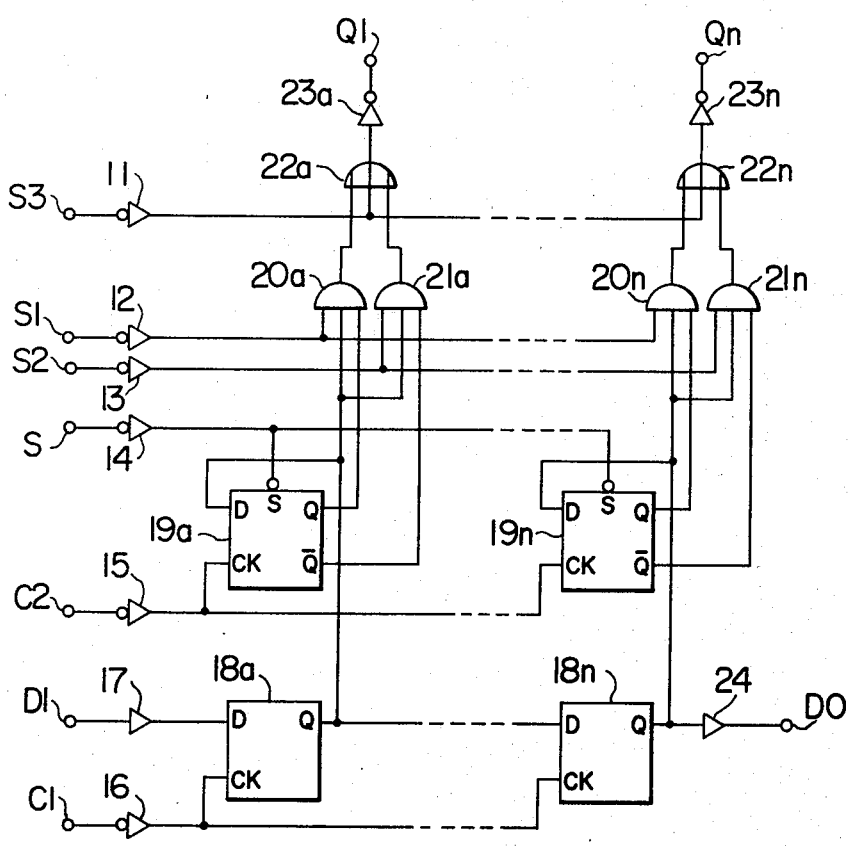
FIG. 2 is a circuit diagram showing one embodiment of a printing pulse control circuit for a thermal printing head according to the invention.

Referring now to FIG. 2, there is shown a printing pulse control circuit embodying the invention. The control circuit comprises one-input NAND circuits 11 to 16, one-input AND circuits 17 and 24, latch circuits 18a to 18n adapted to store serial data from a terminal $D_1$, latch circuits with a set terminal 19a to 19n adapted to store bit information of the latch circuits 18a to 18n as parallel information, AND circuits 20a to 20n connected to make the logical product of the outputs of NAND circuit 12, latch circuits 18a to 18n and latch circuits with a set terminal 19a to 19n, AND circuits 21a to 21n connected to make the logical product of the outputs of NAND circuit 13, latch circuits 18a to 18n and latch circuits with set terminals 19a to 19n, OR circuits 22a to 22n connected to receive the outputs of AND circuits 20a to 20n and 21a to 21n and the input signal from a terminal $S_3$, and open collector type inverter drive circuits 23a to 23n. A clock signal input terminal $C_1$ is connected to the latch circuits 18a to 18n through the NAND circuit 16, a data input terminal $D_1$ receives a data which determines black or white information, a clock signal input terminal $C_2$ is connected to the latch circuits with set terminals 19a to 19n through the NAND circuit 15, a set signal input terminal S receives a set signal, an input terminal $S_1$ receives a pulse of a larger pulse width (a first strobe signal) for controlling heat generation in the thermal resistor elements of the thermal printing head, and an input terminal $S_2$ receives a pulse of a smaller pulse width (a second strobe signal). A terminal $S_3$ receives a pulse of a smaller pulse width for controlling pre-heat of the thermal resistor elements. Output terminals $Q_1$ to $Q_n$ are connected to a number of thermal resistor elements constituting the thermal printing head (not shown), and an output terminal $D_o$ is connected to a subsequent stage of a pulse control circuit similar to this circuit of FIG. 2 when the number of bits is in excess of n bits. The above circuit components are integrally formed on a single silicon chip.

Although not shown, each of the plurality (1 to n) of thermal resistor elements constituting the thermal printing head has one end connected to corresponding one of the output terminals $Q_1$ to $Q_n$ and the other end connected to a common power source. Currents flow through ones of the thermal resistor elements associated with ones of the output terminals $Q_1$ to $Q_n$ now bearing black information "0" and portions of paper in contact with those thermal resistor elements color to print black record. Information necessary for making the output terminals $Q_1$ to $Q_n$ bear "1" or "0" is serially applied to the data input terminal $D_1$ and serially transferred to the latch circuits 18a to 18n for storage therein in response the first clock signal from the terminal $C_1$. The serial n-bit information is stored as parallel information in the latch circuits with set terminals 19a to 19n in response to the first clock signal from the terminal $C_1$. The information signals stored in the latch circuits 19a to 19n are read out in response to the second clock signal from the terminal $C_2$. When the serial information is converted into the parallel information by the first clock signal from the terminal $C_1$, next serial information is applied to the data input terminal $D_1$ and, in a manner as above, stored as serial information in the latch circuits 18a to 18n is response to the first clock signal from the terminal $C_1$. Then, ones of the AND circuits 20a to 20n associated with bits corresponding to "1" outputs Q of the latch circuits 18a to 18n and "1" outputs Q of the latch circuits with set terminals 19a to 19n are selected in response to a strobe signal as applied from the terminal $S_1$ via the NAND circuits 12. The outputs of the selected AND circuits are applied to associated open collector type inverter drive circuits 23a to 23n via associated OR circuits 22a to 22n and associated output terminals $Q_1$ to $Q_n$ bear "0" during the application of the strobe signal $S_1$. In this case, the clock signals $C_1$ and $C_2$ and the strobe signal $S_1$ are applied simultaneously. In this way, current flows through ones of the thermal resistor elements designated by ones of the output terminals $Q_1$ to $Q_n$ bearing "0" and portions of printing paper in contact with associated thermal resistor elements color in black under the control of the larger pulse width control signal.

When ones of the AND circuits 21a to 21n associated with bits corresponding to "1" outputs $\overline{Q}$ of the latch circuits 18a to 18n and "1" outputs Q of the latch circuits with set terminals 19a to 19n are selected in response to a second strobe signal as applied from the terminal $S_2$ via the NAND circuit 13, the outputs of the selected AND circuits are applied to associated open collector type inverter drive circuits 23a to 23n via associated OR circuits 23a to 22n and associated output terminals $Q_1$ to $Q_n$ bear "0" during the application of the second strobe signal $S_2$. In this case, the clock signals $C_1$ and $C_2$ and the strobe signal $S_2$ are applied simultaneously. In this way, the second strobe signal $S_2$ having a smaller pulse width causes current to flow through the designated thermal resistor elements during a time interval which is shorter than that determined by the first strobe signal $S_1$, thus coloring printing paper in black. Neither ones of the AND circuits 20a to 20n nor ones of the AND circuits 21a to 21n associated with bits corresponding to "0" outputs Q of the length circuits 18a to 18n are selected and associated output terminals $Q_1$ to $Q_n$ bear "1". As a result, no current flows through the thermal resistor elements and the printing paper remains white.

On the other hand, a strobe signal $S_3$ as applied via the NAND circuit 11 is transmitted to the open collector type inverter drive circuits via the OR circuits 22a to 22n irrespective of output states of the latch circuits 18a to 18n and the latch circuits with set terminals 19a to 19n to bring the generating resistors into pre-heat condition. Thus, the output terminals $Q_1$ to $Q_n$ bear "0" simultaneously. And, the latch circuits with set terminals 19a to 19n are initialized by a set signal as applied from the terminal S via the NAND circuit 14 when the thermal record operation starts.

With the printing pulse control circuit for the thermal printing head as shown in FIG. 2, each bit of printing information for the preceding line is stored in an associated one of the latch circuits with set terminals 19a to 19n, and each bit of information for the present line is stored as serial information in associated one of the latch circuits 18a to 18n. And, when the printing information for the present line stored in the latch circuits bears "1" indicating black record and the printing information for the preceding line stored in the latch circuits with set terminals bears "1" indicating black record, the strobe signal of smaller pulse width is applied from the terminal $S_2$ to the open collector type inverter circuits 23a to 23n via the NAND circuit 13, AND circuits 20a to 20n and OR circuits 22a to 22n. When the printing information for the present line stored in the latch circuits 18a to 18n bears "1" indicating black record and the printing information for the preceding line stored in the latch circuits with set terminals bears "0" indicating white record, the strobe signal of larger pulse width is applied from the terminals $S_1$ to the open collector type inverter circuits 23a to 23n via the NAND circuit 12, AND circuits 21a to 21n and OR circuits 22a to 22n. In other words, since the pulse width of the pulse for determining the duration of current to be passed through the thermal resistor elements is so changed as to ensure that for bits of "black record" for the present line following "white record" for the preceding line, the strobe pulse (printing pulse) of larger pulse width is applied, so that "black" record consistency following "white" record can advantageously be prevented from being paled. The pulse widths of the strobe signals from the terminals $S_1$ and $S_2$ are designed to be variable depending on temperature of the thermal printing head. If unevenness of printing consistency occurs which is due to varying temperature of the thermal printing head, the temperature of the thermal printing head is detected, and the strobe signal from the terminal $S_3$ is varied in its pulse width in accordance with the detected temperature in the same manner described in the embodiment shown in FIG. 3 and applied as so-called heat pulse. Specifically, the variable width of the heat pulse is controlled to a small width to the extent that the thermal printing paper will not color, and the heat pulse is applied as pre-heat pulse, thereby eliminating unevenness of printing consistency.

As will be seen from the foregoing embodiment, according to the invention, heat generation in the thermal resistor elements of the thermal printing head is controlled by the strobe signal of smaller pulse width when the printing information for a bit of the preceding line is "black" and by the strobe signal of larger pulse width when the printing information for the same bit of the present line is "black" and that for the bit preceding line is "white". As a result, unevenness of printing consistency due to temperature variation in the thermal head can be obviated and paling of printing consistency when black record follows white record can also be eliminated, thereby ensuring that quality of pictures to be printed by the thermal printing head can be improved greatly.

Figure 3:
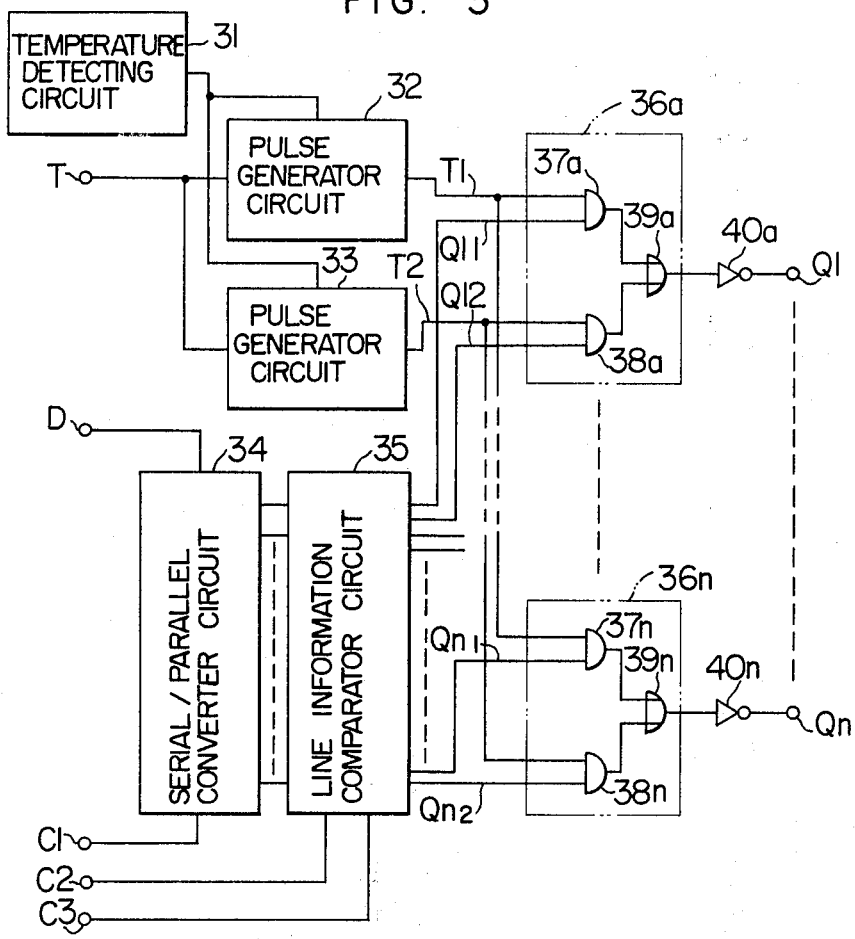
FIG. 3 is a circuit diagram showing another embodiment of printing pulse control for a thermal printing apparatus according to the invention.
Figure 4:
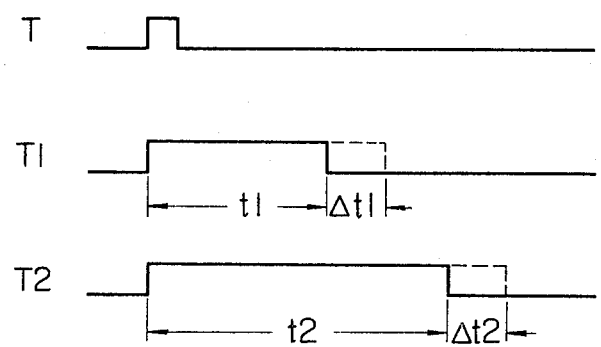
FIG. 4 is a time chart for control of FIG. 3.

Another embodiment of a printing pulse control circuit for a thermal printer according to the invention will now be described with reference to FIGS. 3 and 4.

Serial data of n-bits for the present line now being printed is applied to a terminal D and converted into parallel information of n bits for the present line at a serial/parallel converter circuit 34 in synchronism with a control signal $C_1$. Parallel information of n bits for the preceding line which precedes by one line with respect to the present line has been stored in a line information comparator circuit 35 and is compared with the parallel information of n bits for the present line. The number n of bits coincides with the number of thermal register elements of the thermal printer. Each of n bits of the parallel information for the present line is compared with corresponding one of n bits of the parallel information for the preceding line at the line information comparator circuit 35. As a result of the comparison, when the parallel information for a bit of the present line is black record information and that for the same bit of the preceding line is black record information a selecting signal $(Q_{11}, \ldots, Q_{n1})$ bears a "H" level and a selecting signal $(Q_{12}, \ldots Q_{n2})$ bears an "L" level; when the parallel information for a bit of the present line is black record information and that for the same bit of the preceding line is white record information, the selecting signal $(Q_{11}, \ldots Q_{n1})$ bears the "L" level and the selecting signal $(Q_{12}, \ldots Q_{n2})$ bears the "H" level; and when the parallel information for a bit of the present line is white record information, both the selecting signals $(Q_{11}, \ldots Q_{n1})$ and $(Q_{12}, \ldots, Q_{n2})$ bears the "L" level. A first pulse generator circuit 32 and a second pulse generator circuit 33 receive a printing clock from a terminal T as shown in FIG. 4 and respectively transmit a printing pulse $T_1$ of a pulse width $t_1$ and a printing pulse $T_2$ of a pulse width $t_2$ to pulse selecting circuits 36a to 36n. A temperature detecting circuit 31 detects surface temperature of the thermal resistor elements of the thermal printer and transmits an electric signal representing the surface temperature for controlling the pulse widths of the printing pulses $T_1$ and $T_2$ to the first and second pulse generator circuits 32 and 33. Upon receipt of the pulse width controlling signal, the first and second pulse generator circuits 32 and 33 control the pulse widths of the printing pulses $T_1$ and $T_2$ in accordance with the surface temperature of the thermal resistor elements of the thermal printer. For example, for lower surface temperatures of the thermal resistor elements, the printing pulse $T_1$ is increased in its pulse width by $\Delta t_1$ from $t_1$ to $t_1 + \Delta t_1$. For higher surface temperatures of the thermal resistor elements, the pulse width of the printing pulse $T_1$ is conversely decreased from $t_1$. The second pulse generator circuit 33 operates in a similar manner to the first pulse generator circuit 32.

In accordance with the selecting signals $Q_{11}, \ldots, Q_{n1}$ and $Q_{12}, \ldots, Q_{n2}$ transmitted from the line information comparator circuit 35 and the printing pulses $T_1$ and $T_2$ are selected by the pulse selecting circuits 36a to 36n including AND gates 37a to 37n, AND gates 38a to 38n and OR gates 39a to 39n. Signals $T_1$ and $T_2$ selected by the pulse selecting circuits 36a to 36n are applied via drive circuits 40a to 40n to the thermal resistor elements of the thermal printer. For example, when the printing data for a bit of the present line is black record information and that for the bit of the preceding line is black record information, the corresponding one of the AND gates 37a to 37n is selected and hence the printing pulse $T_1$ is applied; when the printing data for a bit of the present line is black record information and that for the bit of the preceding line is white record information, corresponding one of the AND gates 38a to 38n is selected and hence the printing pulse $T_2$ is applied; and when the printing data for a bit of the present line is white record information, neither of corresponding one of the AND gates 37a to 37n nor corresponding one of the AND gates 38a to 38n are selected, thus preventing the application of the printing pulse.

In this way, the printing pulse $T_1$ of smaller pulse width is applied to the thermal resistor elements with the black record information for the present line and the black record information for the preceding line whereas the printing pulse $T_2$ of larger pulse width is applied to the thermal resistor elements with the black record information for the present line and the white record information for the preceding line.

After completion of printing for the present line, the n-bit printing information for the present line is stored in the line information comparator circuit 35 in response to a control signal $C_2$ to establish preceding-line n-bit printing information for the subsequent-line printing operation.

The above printing operation is successively repeated. In general, as the printing operation proceeds, surface temperature of the thermal resistor elements will rise. For correction of such a temperature rise, the printing pulses $T_1$ and $T_2$ are so controlled as to reduce their pulse widths. When starting printing, the entire n bits of black record information have already been stored as preceding-line n-bit printing data in the line information comparator circuit 35 by a control signal $C_3$.

As has been described, in the printing pulse control circuit for the thermal printer according to the invention, the printing pulse width for a bit of the present line is controlled by the record information for the bit of the preceding line so that the prior art drawback of paling the black printing consistency for the bit of the present line in the case of the black record information for the bit of the present line following the white record information for the bit of the preceding line can be eliminated, thereby achieving printing of uniform consistency irrespective of the type of the printing data.

I claim:

1. A printing pulse control circuit for a thermal printing head comprising:
   n-bit latch circuits adapted to serially store an input data;
   latch circuits with set terminals adapted to store each bit information of said latch circuits as parallel information;
   a combination of first and second AND circuits which delivers out a first strobe signal of a larger pulse width when both the serial information stored in said latch circuits and said parallel information stored in said latch circuits with set terminals represent a first bit information and selects, in respect of each bit, a second strobe signal of a smaller pulse width than that of said first strobe signal when the serial information and the parallel information represent first and second bit informations, respectively;
   OR circuits each connected to make the logical sum of the corresponding one of the outputs of said first and second AND circuits and a third strobe signal applied as a pre-heat pulse; and
   inverter drive circuits each connected to the corresponding one of the outputs of said OR circuits,
   said latch circuits, latch circuits with set terminals, first and second AND circuits, OR circuits and inverter drive circuits being integrally formed on a single silicon chip.

2. A printing pulse control circuit for a thermal printing head according to claim 1, wherein the first bit information represents a logical "1" and the second bit information represents a logical "0".

3. A printing pulse control circuit for a thermal printing head according to claim 1, wherein said first AND circuits are connected to receive outputs from said latch circuits, said latch circuits with set terminals and a first strobe signal means for delivering said first strobe signal to said OR circuits, and said second AND circuits are connected to receive outputs from said latch circuits, said latch circuits with set terminals and a second strobe signal means for delivering said second strobe signal to said OR circuits.

4. A printing pulse control circuit for a thermal printing head comprising:
   a first printing pulse generator circuit;
   a second printing pulse generator circuit;
   an n-bit serial/parallel converter circuit; and
   a comparator circuit adapted to compare a printing data for the present line to be printed and a printing data for the preceding line which has already been printed,
   whereby following conversion of the n-bit printing data from serial information to parallel information at said n-bit serial/parallel converter circuit, a first printing pulse generated from said first printing pulse generator circuit is applied to the thermal resistor elements of the thermal printing head when the printing data for the present line is black record information and that for the preceding line is black record information; a second printing pulse generated from said second printing pulse generator circuit is applied to the thermal resistor elements when the printing data for the present line is black record information and that for the preceding line is white record information; and neither the first printing pulse nor the second printing pulse is applied to the thermal resistor elements when the printing data for the present line is white record information.

* * * * *